United States Patent
Francia

[19]

[11] Patent Number: 5,809,855
[45] Date of Patent: Sep. 22, 1998

[54] ROLLER BEARING ASSEMBLY FOR SHAVE TOOL HOLDER

[75] Inventor: Paul P. Francia, Rochester, N.Y.

[73] Assignee: C.J. Winter Machine Works, Inc., Rochester, N.Y.

[21] Appl. No.: 848,472

[22] Filed: May 8, 1997

Related U.S. Application Data

[62] Division of Ser. No. 498,675, Jul. 3, 1995, Pat. No. 5,737,984.

[51] Int. Cl.$^6$ ..................................................... B23B 29/16
[52] U.S. Cl. ................................ 82/157; 82/158; 82/162; 384/45
[58] Field of Search ............................ 82/158, 160, 157, 82/162, 163, 100, 101; 384/45

[56] References Cited

U.S. PATENT DOCUMENTS

| | | | |
|---|---|---|---|
| 2,746,332 | 5/1956 | Smith | 82/157 |
| 3,071,997 | 1/1963 | Schlitters | 82/157 |
| 3,094,024 | 6/1963 | Synk et al. | 82/157 |
| 3,576,145 | 4/1971 | Bernath et al. | 82/157 |
| 3,841,179 | 10/1974 | Brown, II | 82/157 |
| 4,927,273 | 5/1990 | Mottate | 384/45 |
| 5,109,720 | 5/1992 | Kasuga | 384/45 X |
| 5,460,452 | 10/1995 | Hara | 384/45 |

FOREIGN PATENT DOCUMENTS

| 1812376 | 7/1970 | Germany | 384/45 |
|---|---|---|---|

*Primary Examiner*—A. L. Pitts
*Assistant Examiner*—Henry W. H. Tsai
*Attorney, Agent, or Firm*—Shlesinger Fitzsimmons Shlesinger

[57] ABSTRACT

The body section of the holder carries at one side a shaving tool bit and work supporting roller, and is removably mounted at its opposite side on the slide section of the holder by a quick release pin, which is reciprocable in a bore in the slide section. A spring normally urges the inner end of the pin into an opening in the body section to prevent its removal from the slide section, but to permit limited floating movement of the body section relative to the slide section. The pin may be retracted manually to allow removal of the body section. The work supporting roller is also removably and adjustably mounted on the body section; and the slide section is adjustably supported on an adapter to be mounted thereby on a machine cross slide. Two sets of ball bearings are interposed between the body and slide sections to facilitate floating movement of the former on the latter.

6 Claims, 5 Drawing Sheets

ROLLER BEARING ASSEMBLY FOR SHAVE TOOL HOLDER

This application is a division of my application Ser. No. 08/498,675, filed Jul. 3, 1995, now U.S. Pat. No. 5,737,984.

BACKGROUND OF THE INVENTION

This invention relates to shaving tools of the type which are employed in conjunction with work supporting rollers in multiple spindle screw machines and the like, and more particularly to an improved shave tool holder having quick release means which significantly increases the ease with which the associated work supporting roller and/or tool holder body can be inspected and/or changed.

There are currently available in the marketplace today a variety of different shaving tools and associated holders therefor. Typically the shaving tool and associated holder are mounted on a dovetailed slide for limited, floating movement during operation of the tool. One of the disadvantages of such a tool, however, is the difficulty encountered and the time involved in changing or replacing a tool and the associated roller, as well as the difficulty in effecting adjustments in the work supporting roller It is an object of this invention, therefore, to provide an improved shave tool holder of the type described having novel quick release means which enables the body of the holder to be quickly and easily removed from or mounted on the associated slide section of the holder.

Another object of this invention is to provide a shave tool holder of the type described having improved means for removably and adjustably mounting on the body thereof the associated work supporting roller.

Still another object of this invention is to provide a holder of the type described in which the moving parts thereof have rolling contact surfaces to reduce friction and consequent wear of such parts.

It is an object also of this invention to provide an improved shave tool holder having a removable and replaceable tool clamp or bracket which enables a variety of tool bits of different sizes to be employed in the holder.

A further object of this invention is to provide an improved shave tool holder which can be quickly and easily adjusted selectively to tilt its associated shaving tool slightly in opposite directions about an axis extending normal to the work being shaved.

Other objects of the invention will be apparent hereinafter from the specification and from the recital of the appended claims, particularly when read in conjunction with the accompanying drawings.

SUMMARY OF THE INVENTION

The slide section of a shave tool holder has in the front surface thereof a vertical slot, and has projecting from its rear surface a cylindrically-shaped shank for mounting the holder on the cross slide of a multiple spindle screw machine or the like. The holder has a body section which at one end thereof is supported by ball bearings in the slot in the front surface of the slide section for limited, floating movement relative to the slide section. On its forward end the body section carries adjacent its lower end a shaving tool bit which is disposed to engage a piece of rotating bar stock, or the like, and carries adjacent its upper end a work supporting roller disposed to overlie the bar stock during a shaving operation.

The body section of the holder is releasably connected to the slide section by a quick release pin, which is slidable in an axial bore in the shank of the slide section, and which has its inner end releasably seated in a recess formed in a spring-loaded pin carried by the body section for limited movement in a bore in the body section as the latter floats relative to the slide section. The quick release pin can be shifted manually against the resistance of a spring to withdraw its inner end from engagement with the pin in the body section which can then be removed from the slot in the slide section.

The work supporting roller is carried by a holder which is adjustably mounted via ball bearings in the forward end of the body section. An adjusting screw, which is mounted by a bracket on the body section for selective rotation in the bracket has a threaded shank threaded in the roller holder to adjust the space between the roller and the shaving bit upon rotation of the adjusting screw.

THE DRAWINGS

Figure 3:
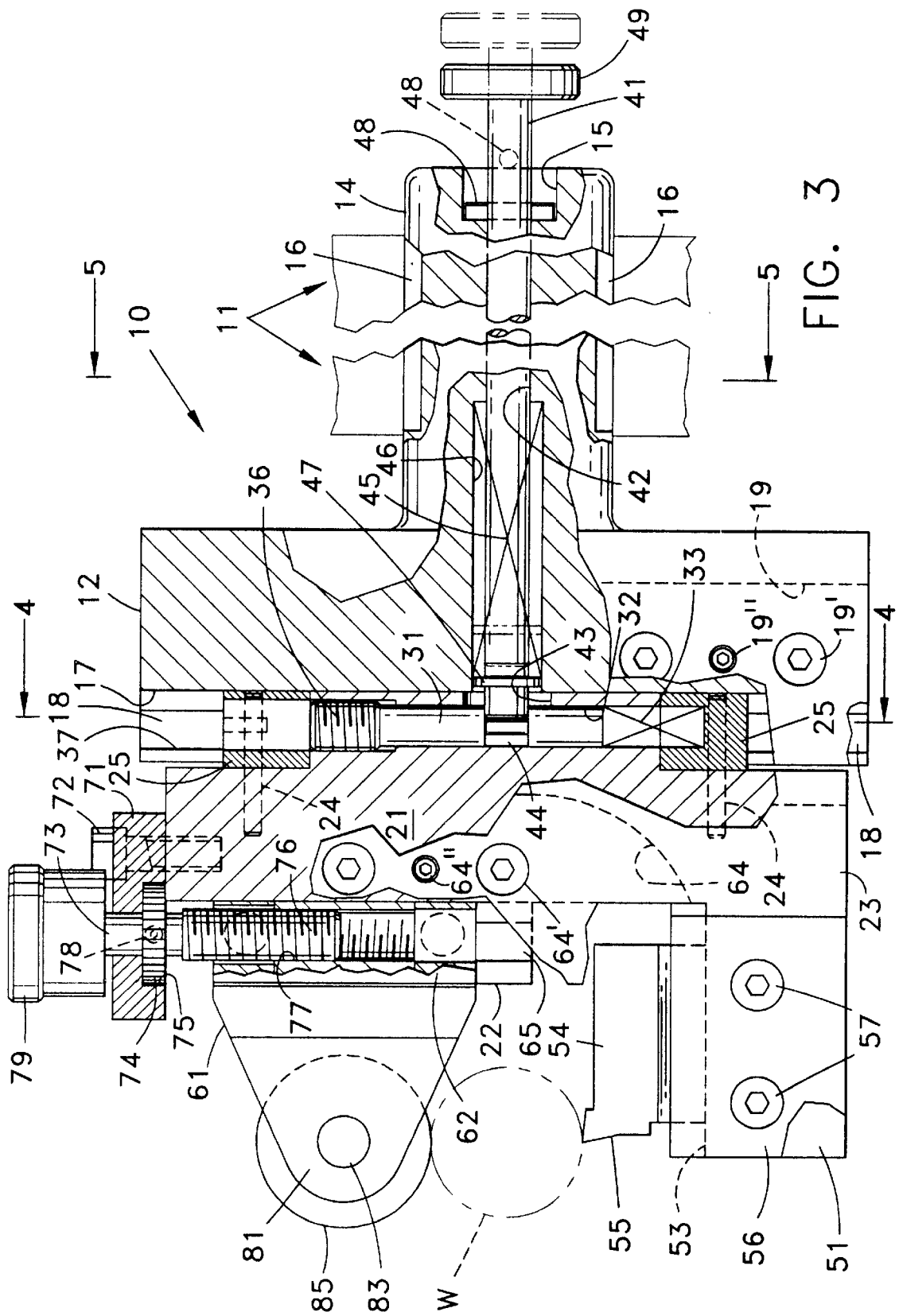
FIG. 3 is a side elevational view of this holder with portions thereof being broken away and shown in section.
Figure 5:
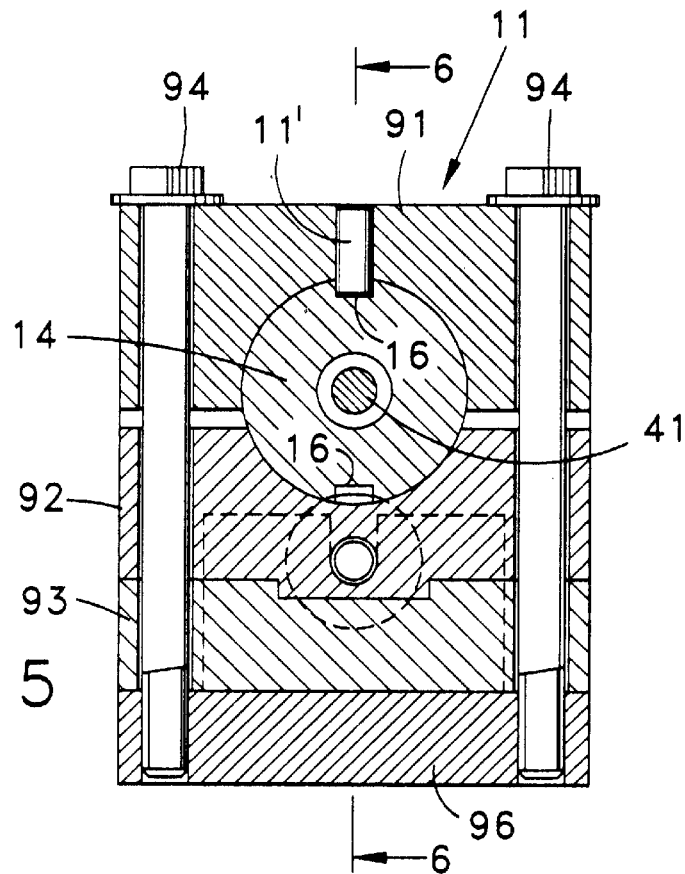
Figure 6:
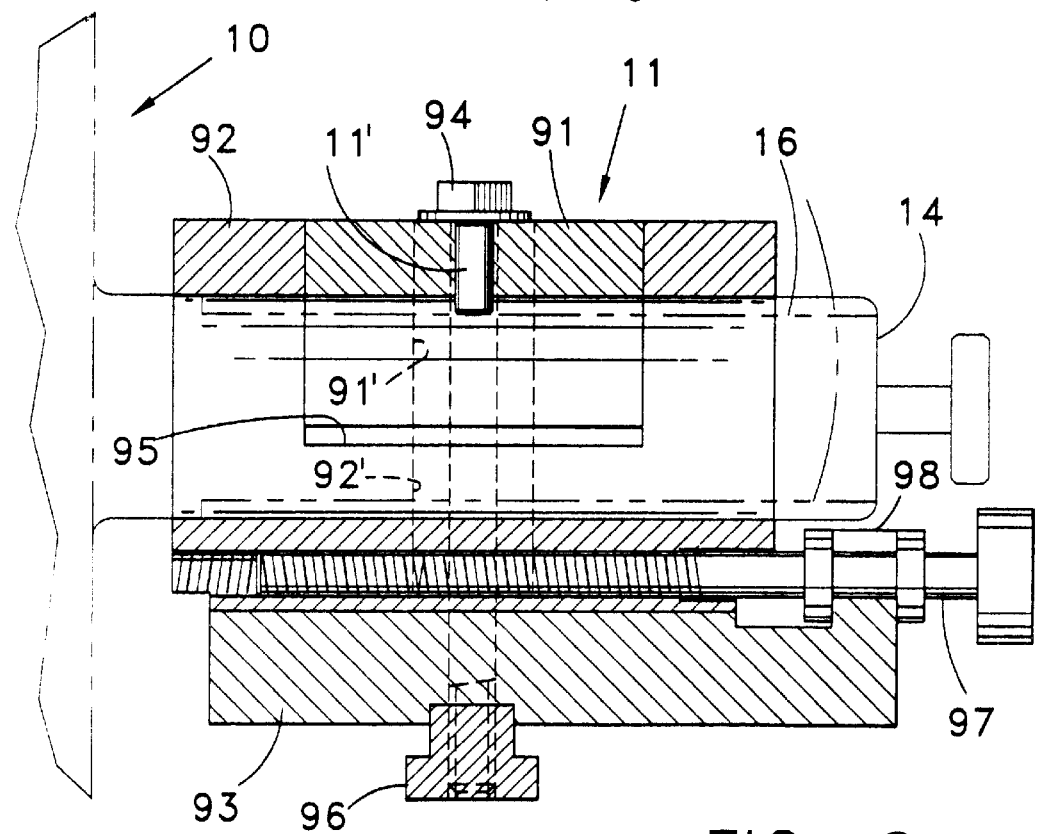

FIG. 5 is a sectional view taken generally along the line 5—5 in FIG. 3 looking in the direction of the arrows, and showing in greater detail the adapter which is employed for adjustably mounting the holder on a machine slide; and FIG. 6 is a sectional view taken generally along line 6—6 in FIG. 5 looking in the direction of the arrows, but with the tool holder being shown fragmentarily and in phantom by broken lines.

DETAILED DESCRIPTION OF THE PREFERRED EMBODIMENTS

Figure 1:
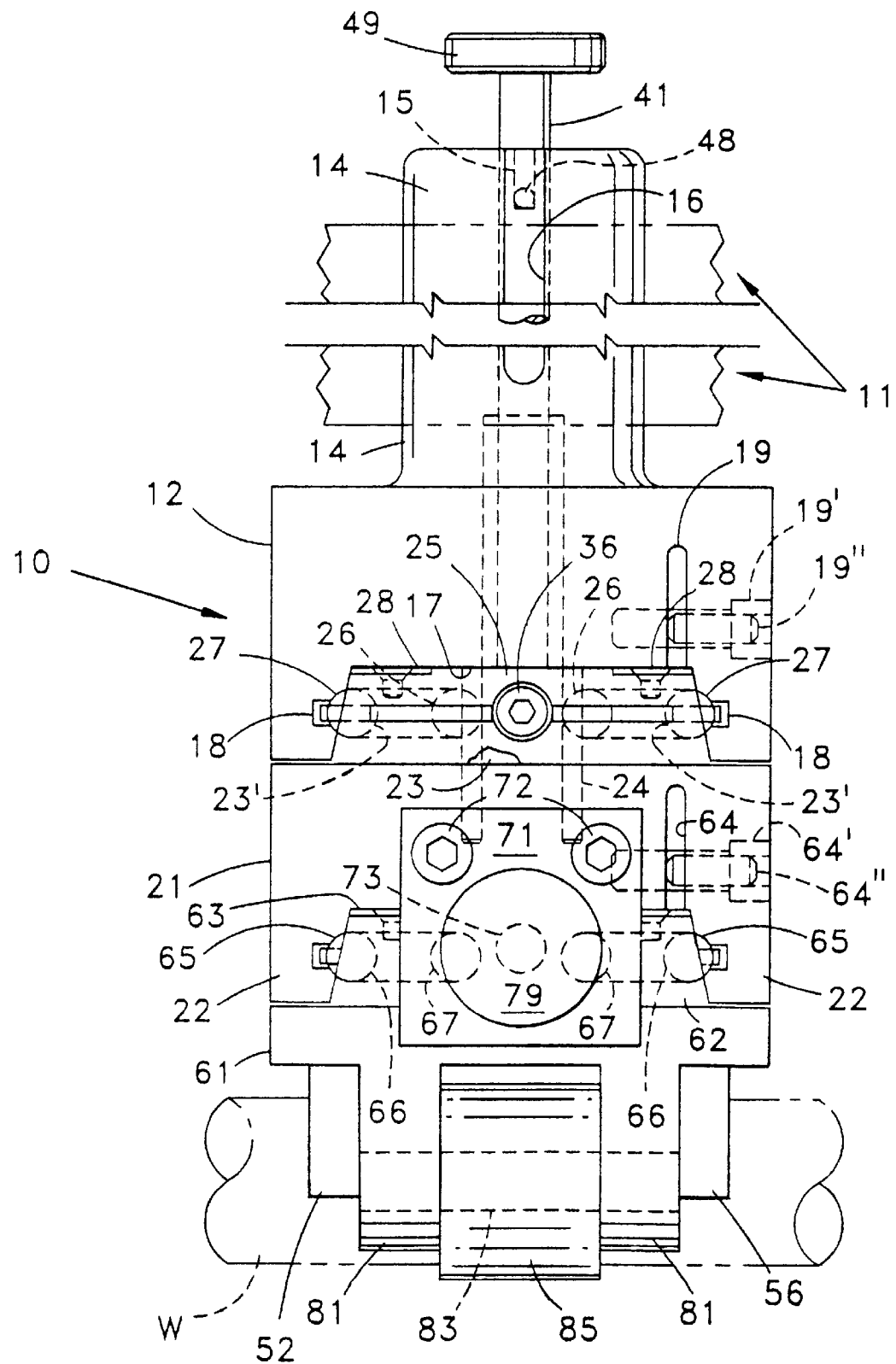
FIG. 1 is a fragmentary plan view of a shave tool holder made according to one embodiment of this invention, portions of the support for the holder being shown in section, and an associated workpiece being shown in phantom by broken lines.

Referring now to the drawings by numerals of reference, 10 denotes generally a shave tool holder comprising a generally rectangularly shaped slide section 12 having an integral, cylindrically shaped shank 14, which projects centrally from one side thereof (the upper side as shown in FIG. 1). As noted in greater detail hereinafter, the shank section 14 is secured intermediate its ends in a bore or opening in an adapter 11, which is shown only fragmentarily in FIGS. 1 and 3, and is disposed to be carried as noted hereinafter by a slide (not illustrated) that supports the tool 10 for sliding movement on a multiple spindle screw machine or the like, toward and away from a piece of rotating stock or work W. In the side thereof opposite that from which the shank 14 projects, slide section 12 has therein a vertically extending, generally trapezoidally shaped slot or groove 17 the opposed, confronting side walls of which have formed therein conventionally shaped ball bearing races 18, which extend vertically of the slide section 12 at opposite ends of its groove 17. Adjacent one of its side walls (the right side wall in FIG. 1) groove 17 has in the bottom thereof a deep slot 19 which enables adjustment of the width of the groove as noted hereinafter.

Removably mounted on the slide section 12 for limited vertical movement relative thereto is the main body 21 of the holder 10. Body 21, which also is generally rectangular in configuration, but slightly less in overall height than the slide section 12, has projecting from its plane, forward surface (the lower surface in FIG. 1) a pair of laterally spaced, vertically extending projections 22, which are used for supporting a roller holder as noted hereinafter. Projecting from the rear or upper surface of body 21 as shown in FIG. 1, is a generally trapezoidally shaped, vertically extending projection 23, which is complimentary to, and which seats slidably in the recess 17 in the slide section 12. The opposed, vertically extending sidewalls of projection 23 have formed therein vertically extending, ball bearing races 23', which confront upon the races 18 formed in the slide section 12. Slightly inwardly of its ball races 23' projection 23 has formed therethrough a pair of spaced, parallel, longitudinally extending bores 26 (FIG. 4), each of which is disposed to communicate at opposite ends thereof with opposite ends of the adjacent race 23'.

Secured over two pairs of dowel pins 24, which are secured in and project from the face of the body projection 23 adjacent opposite ends thereof, are two bearing caps 25. Opposite ends respectively of each bearing cap 25 have therein arcuate recesses or raceways 25' which overlie and register with the confronting ends of each set of the races 23' and 26 at each end of projection 23, thereby forming two endless, two-row gothic arch type endless grooves in each of which grooves is housed a plurality of ball bearings 27. These bearings may be inserted into or withdrawn from their associated raceways through registering circular openings 27', which are formed in opposite ends of each cap 25, and which normally are covered or closed by two cover straps 28 releasably secured by screws 28' on projection 23 adjacent opposite sides thereof. To maintain each set of the ball bearings 27 in its associated raceway when the parts 12 and 21 are separated, each of two elongate wire retainers 29 is hooked at opposite ends thereof to a pair of the dowel pins 24, and extends intermediate its ends over the bearings 27 in a respective raceway 23'. Also, to enhance the rolling movement of the bearings 27, one additional guide bearing 30 is secured in a recess formed in each end of the section of projection 23 that separates each pair of associated races 23' and 26. Thus, two such sets of ball bearings are used to support body 21 for vertical movement relative to the slide section 12.

Figure 4:
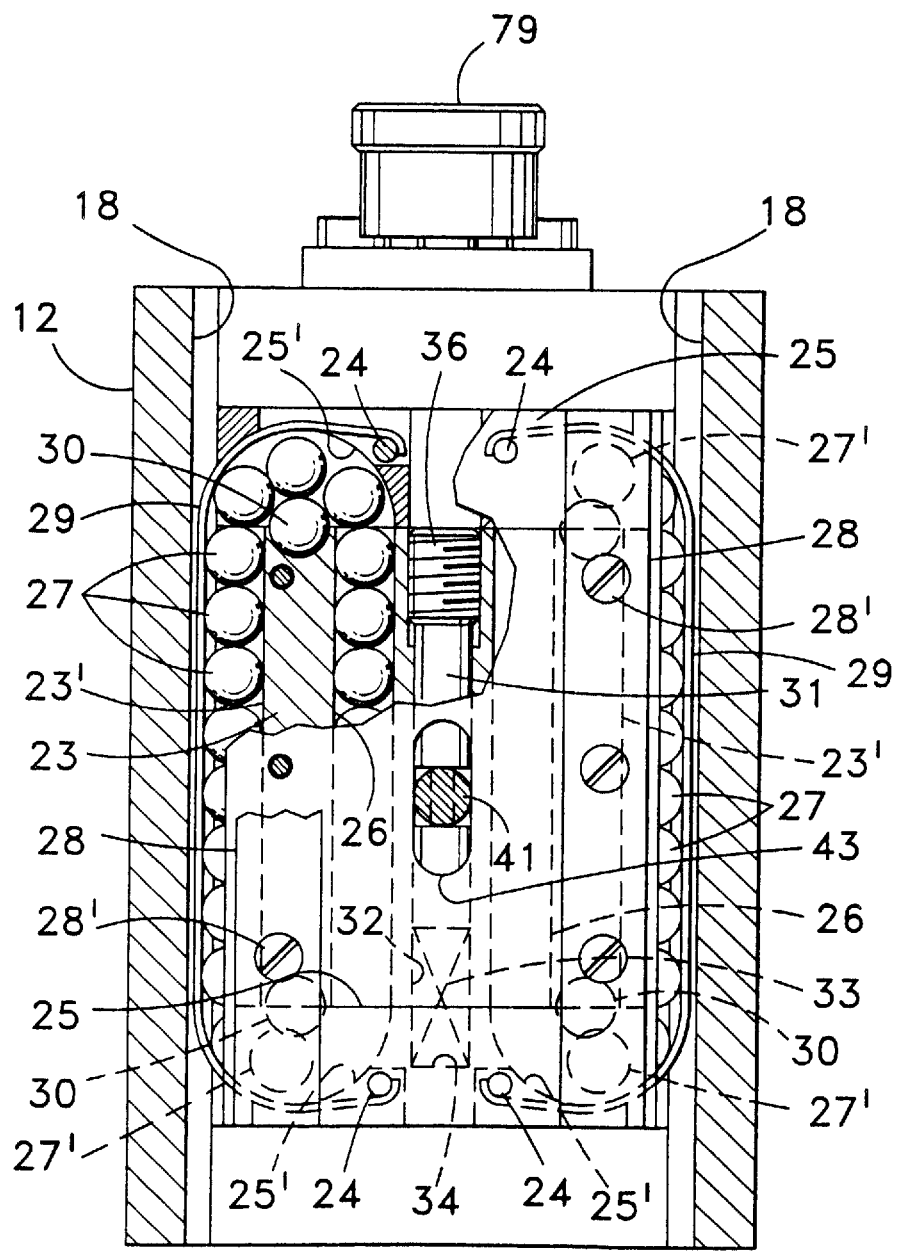
FIG. 4 is a sectional view taken generally along the line 4—4 in FIG. 3 looking at the direction of the arrows.

However, the vertical movement of body 21 relative to slide section 12 is limited by a cylindrically shaped pin 31, which is slidably mounted in a vertical bore 32, which is formed centrally of the projection 23 on body 21. Pin 31 is engaged at one end thereof (the lower end in FIG. 3) with the upper end of a compression spring 33 (FIGS. 3 and 4), which is mounted in the lower end of bore 32 with one end thereof seated in a central recess 34 (FIG. 4) formed in the inner surface of the lower end cap 25, and with its opposite end engaged with the lower end of pin 31. As best shown in FIGS. 3 and 4, the upper end of pin 31 is engaged with the inner end of an adjustable set screw 36, which is threaded into the upper end of bore 32 to be accessible through a central opening or bore 37 formed in the upper end cap 25.

Pin 31 is secured against movement relative to the slide 12 by the inner end of an elongate, cylindrically shaped, quick release pin 41, which is slidably mounted intermediate its ends in an axial bore 42 in the slide shank 14, and which projects at its inner end through a registering, elongate slot 43 (FIG. 3) in the body projection 23, and into an annular recess 44 formed in pin 31 intermediate its ends. A compression spring 45, which surrounds pin 41 adjacent its inner end, is seated at one end (its right end as shown in FIG. 3) in the bottom of a counterbore 46 that is formed in the inner end of bore 42, and at its opposite end against a washer 47 which is carried by pin 41 adjacent the inner end of the latter. Spring 45 thus tends to urge the inner end of pin 41 resiliently into locking engagement with recess 44 in pin 31, thus retaining pin 31 against movement relative to the slide section 12. However, the body 21 remains free to be moved relative to the slide section 12 via the ball bearings 29, and against the resistance of the compression spring 33, which will be compressed slightly as the body section 21 moves vertically relative to the slide section 12. During such movement, since the pin 31 is fixed against movement relative to section 12, the pin 31 slides in the bore 32 relative to the body 21. The compression force resisting movement of the body 21 relative to the slide section 12, may, of course, be adjusted by rotating the adjusting screw 36 either to increase or decrease the compression of spring 33.

When pin 41 is in this locking position, it will be noted also that another pin 48, which is secured in and projects from diametrally opposite sides of the quick release pin 41 adjacent its outer or right end as shown in FIG. 3, is at such time seated in the bottom of a locking notch 15, which is formed in the outer or right end of the shank 14 to extend at right angles and transversely of the axis of shank 14. Secured to the outer end of the quick release pin 41 is enlarged-diameter head 49 for manipulating the release pin 41 in a manner noted hereinafter.

Figure 2:
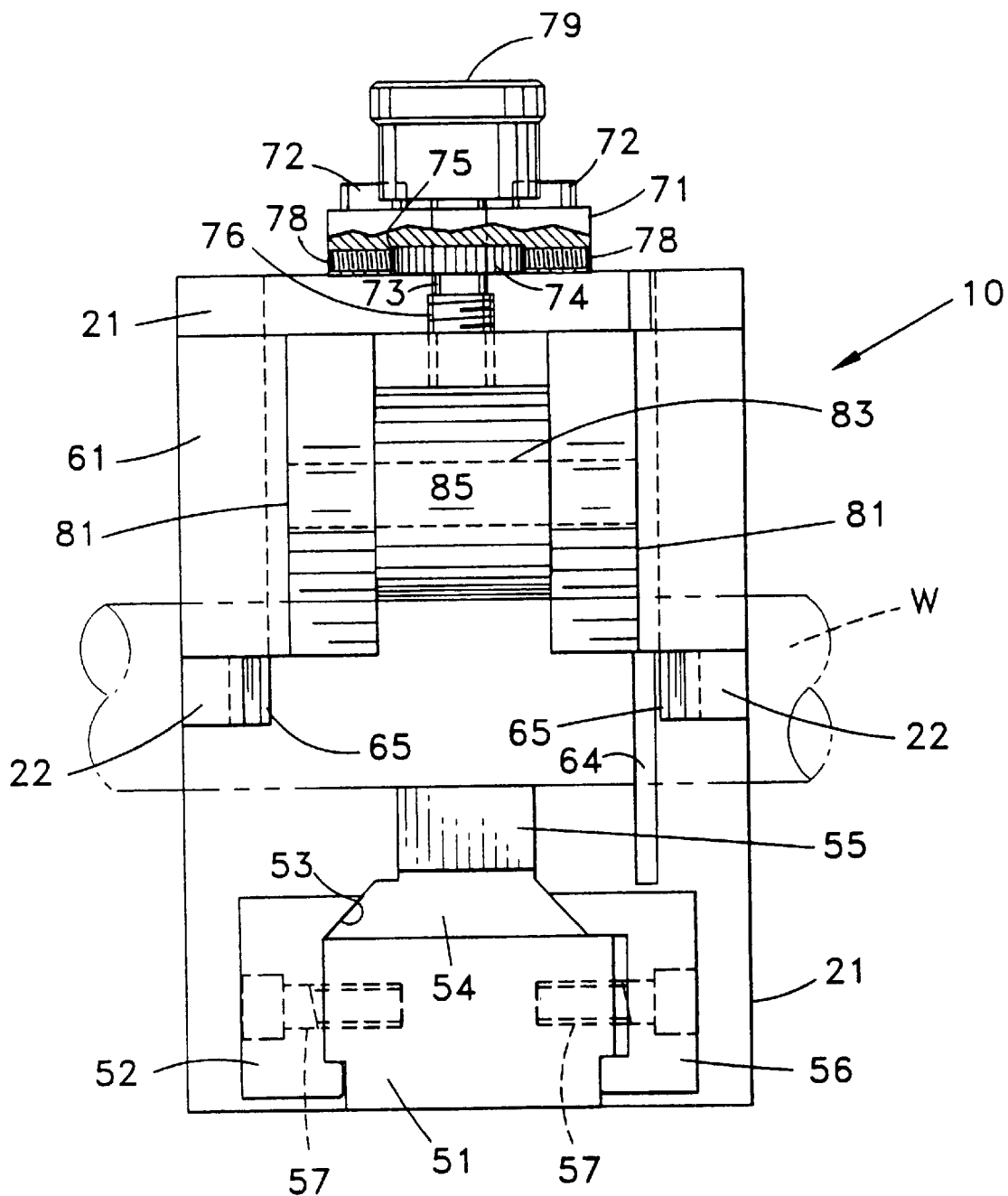
FIG. 2 is a front elevational view of this shave tool holder.

Secured to and projecting centrally from the forward or left end (FIG. 3) of the body 21, and adjacent the lower end thereof, is a tool support 51 having a pair of tool holder clamps 52 and 56 (FIG. 2) secured to opposite sides thereof by screws 57. Clamps 52 and 56 at their upper ends overlie opposite sides of the upper surface of support 51, thereby forming a dovetail recess 53. Adjustably secured by clamps 52 and 56 in recess 53 is the dovetailed base 54 of a conventional tool or bit 55. Since clamps 52 and 56 are removable and replaceable by differently shaped clamps, it is possible to adjust the lateral position of the bit 55, or to use a bit having a differently shaped base 54 or cutting edge, if desired.

Adjustably mounted on the forward end of the main body 21 above the tool support 51 is a roller holder 61. Holder 61 has projecting from the inside surface thereof (the surface facing body 21) a generally trapezoidally shaped projection 62, which projects into a similarly shaped groove or recess 63 formed between the projections 22 on the forward surface of body 21. Each of the inner, confronting surfaces of the body projections 22 has formed therein a vertically extending ball bearing race 65, and as in the case of groove 17, groove 63 has in the bottom thereof a deep slot 64 which enables adjustment of the width of groove 63 as noted hereinafter. Opposite sides of the projection 62 on holder 61 also have formed therein vertically extending ball bearing races 66, which confront upon and register with ball bearing races in the body projections 22. As in the case of the projection 23 at the rear of body 21, the projection 62 at the rear of the holder 61 has formed therethrough a pair of spaced, parallel vertically extending bores 67, which like the bores 26 in projection 23, cooperate with the adjacent ball bearing races 65 to form adjacent each side of projection 62 an endless ball bearing groove in which are mounted a plurality of ball bearings which function in a manner similar to that described in connection with ball bearings 27. Housing 61 is thus supported for vertical movement between the projections 22 on the body 21 by a ball bearing mechanism similar to that described above in connection with the bearings employed for mounting the body 21 on the slide section 12.

For adjustably supporting roller holder 61 on body 21, a rectangular support plate 71 is secured adjacent one side thereof by a pair of screws 72 to the upper surface of body 21, and in such manner that plate 71 extends horizontally adjacent its opposite side over the upper surface of the holder 61 in spaced relation thereto. A headed adjusting screw 73 has secured or otherwise formed thereon intermediate its ends an enlarged-diameter, externally knurled disc 74, which seats snugly and coaxially in a circular recess 75 that is formed in the underside of plate 71 to overlie in the upper end of holder 61. Screw 73 has an externally threaded shank 76, which extends coaxially beneath the knurled disc 74, and which threads adjustably into an internally threaded bore 77, which extends through holder projection 62 from its upper surface to the bottom thereof. Two set screws 78 (FIGS. 2 and 3), which are threaded into opposite sides of plate 71, carry on their inner ends spring-loaded detents which are engaged resiliently with the knurled surface on disc 74, thereby normally to prevent rotation of the disc and hence screw 73. However, screw 73 has on its upper end above plate 71 an enlarged-diameter head 79 by means of which the screw may be adjusted as noted hereinafter.

Integral with and projecting centrally from the forward or lower face of the holder 61, as shown in FIG. 1, are two, laterally spaced lugs 81, which are similar in configuration. Mounted at opposite ends in the lugs 81, and extending transversely therebetween, and at right angles to the axis of the release pin 41, is a roller mounting shaft 83. Mounted on shaft 83 for rotation between lugs 81, and coaxially to the axis of shaft 83, is a work support roller 85.

In use, the shank 14 of holder 10 is secured intermediate its ends in the adapter 11, which as shown more clearly in FIGS. 5 and 6 comprises a top plate 91, an intermediate plate 92, and a bottom plate 93. Top plate 91 is secured by a pair of machine bolts 94 in a rectangular slot 95 that is formed in the upper surface of plate 92 to open on opposite sides thereof. Shank 14 is seated at diametrically opposite sides thereof in registering, coaxially disposed arcuate recesses formed in the confronting surfaces of plates 91 and 92, and in such manner that a dowel pin 11', which projects from plate 91 into one of two axial grooves 16 formed in diametrically opposite sides of shank 14, prevents any undersirable rotation of shank 14 in adapter 11.

The shanks of bolts 94 extend through registering openings in all three plates 91, 92 and 93, and thread at their lower ends into an inverted, generally T-shaped support 96, which extends transversely across the bottom of plate 93 for use in mounting adapter 11 on a machine slide. The openings 91' and 92' in plates 91 and 92, respectively, through which the bolts 94 extend, actually are slots extending longitudinally in a direction parallel to the axis of the shank 14 of holder 10, so that when bolts 94 are loose, plates 91 and 92, and hence the holder shank 14, can be shifted slightly relative to the bottom plate 93 and its support 96, thereby permitting slight adjustment of the tool bit 55 transversely of the work W. To effect this adjustment, a headed adjusting screw 97 is mounted adjacent one end to rotate in a lug 98 formed on the rear or right end of plate 93 as shown in FIG. 6, and has its shank threaded into a bore in plate 92, so that by rotating screw 97, plate 92, and hence plate 91 and holder 10 can be shifted parallel to the axis of shank 14.

Also, of course, holder 10 can be advanced in a conventional manner by its associated cross slide (not illustrated) into an operative position (see FIG. 3) in which roller 85 rolls onto the upper surface of the rotating work or bar stock W, thus elevating body 21 relative to slide section 12, and engaging tool 55 with the lower surface of the work. As the work W rotates its outer surface is shaved by the tool 55, at which time the main body 21 and its attached roller holder 61 may be shifted slightly vertically (FIG. 3) relative to the slide section 12, and against the resistance of the compression spring 33, in response to distortions in the bar stock W.

If it is desired to adjust the space separating roller 85 from the tool bit 55, the head 79 of screw 73 may be used to rotate screw 73 relative to the support plate 71 and against the resistance of the spring-loaded detents carried by the screws 78. The screw 73 can thus be rotated in order to shift the position of housing 61 either upwardly or downwardly (FIG. 3) relative to the threaded shank portion 76 of the screw. Once this adjustment has been made, the spring-loaded detents of screws 78 will prevent further rotation of screw 78, and will thus retain housing 61 in its adjusted position. Any such adjustment of the holder 61 relative to the screw 73 is, of course, readily enabled by virtue of the roller bearings which are interposed between the projection 62 on the holder 61, and the supporting projections 22 on the body 21.

Moreover, by utilizing the two sets of roller bearings 27 between the body 21 and the slide section 12, the floating movement of the body 21 relative to the section 12 is considerably enhanced, because the bearings not only control accurate movement of body 21 relative to section 12, but also prevent any undesirable binding or wear which might otherwise occur after prolonged use of the holder 10.

Still another major advantage of this construction is that the body 21 and holder 61 can be readily and quickly removed as a unit from the slide section 12 simply by grasping the head 49 of the quick release pin 41, and drawing this pin against the resistance of spring 45 (upwardly in FIG. 1 or toward the right in FIG. 3) until the pin 48 has been withdrawn from the recess 15 in shank 14, which in turn will cause the inner end of the pin 41 to be retracted into the counterbore 46, and to become disengaged from the notch 44 in the pin 31. At this point body 21 and the attached holder 61 may be lifted as a unit (upwardly in FIG. 3) to remove body projection 23 and its sets of bearings 29 out of the upper end (FIG. 3) of recess 17. When pin 41 has been retracted into its body releasing position, as shown for example by broken lines in FIG. 3, its head 49 can be rotated 90° to cause opposite ends of the pin 48 to overlap the outer end of the shank 14 at opposite sides of the groove 15, as shown in phantom by broken lines in FIG. 3. This retains pin 41 in its retracted position until the head 49 is rotated 90° to return the pin 48 into registry with the groove 15, at which time pin 41 will be returned by spring 45 to its locking position. Thus, simply by manipulating release pin 41 the entire body 21 and holder 61 can be quickly and easily removed or replaced on the slide section 12.

In some instances it may be desired to adjust the preload on the ball bearings empolyed in holder 10, or to replace body section 21, and/or the holder 61 with a corresponding body section 21 or holder 61 that is slightly narrower or wider than the corresponding parts shown herein. For this purpose a plurality of cap screws 19' and set screws 19" (FIGS. 1 and 3) are adjustably threaded into section 12 transversely of the slot 19 and in spaced, alternating relation. Likewise, cap screws 64' and set screws 64" are threaded into body 21 transversely of slot 64. The inner ends of the set screws 19" and 64" engage the far side of their associated slot 19 and 64, respectively, while the cap screws 19' and 64' thread into such far sides. By adjusting such set screws and cap screws, the widths of grooves 17 and 63, respectively, can be adjusted to accomodate different body sections 21 and holders 61.

Moreover, in addition to being able to adjust bit 55 toward and away from the work by the adjusting screw 97, it is possible also to effect slight tilting of the bit 55 about the axis of shank 14. As shown in FIG. 5, the confronting surfaces of plates 91 and 92 are held by shank 14 in slightly spaced relation to each other, so that simply by releasing one or the other of bolts 94 while tightening the other bolt 94, a slight tilting of bit 55 will be effected.

While this invention has been illustrated and described in connection with only certain embodiments thereof, it will be apparent to one skilled in the art that it is capable of still further modification, and that this application is intended to cover any such modifications as may fall within the scope of one skilled in the art or the appended claims.

I claim:

1. In a shave tool holder having a first section adapted to be mounted at one end thereof on a machine cross slide for movement thereby, and a second, tool bit supporting section slidably mounted at one end thereof on, and in confronting relation to, the opposite end of said first section for reciprocation relative thereto in a predetermined path, a roller bearing assembly interposed between the confronting ends of said sections and comprising, a generally trapezoidally-shaped projection on one of said confronting ends of said sections projecting slidably into a registering recess in the other confronting end of said sections, and having opposite sides thereof disposed in spaced, confronting relation to opposite sides of said registering recess, said projection having therethrough a pair of spaced, parallel bores located adjacent and parallel to said opposite sides thereof, and opening on opposite ends thereof to form portions of two different endless roller bearing raceways in said projection, said projection having in each of said opposite sides thereof a groove which extends between said opposite ends of said projection parallel to said bores, and which confronts upon a registering groove formed in the confronting side of said recess, each set of said registering grooves cooperating with one of said bores in said projection to define a further portion of one of said two raceways, a pair of bearing caps secured over said opposite ends, respectively, of said projection, each of said caps having therein a pair of arcuate recesses each of which registers at opposite ends thereof with one end of one of said bores and with one end of one of said sets of registering grooves, thereby to complete the formation of said two endless raceways, and two sets of ball bearings, each of said sets being mounted for endless travel in a respective one of said raceways.

2. In a shave tool holder as defined in claim 1, including a pair of wires retaining the ball bearings of each set thereof in rolling engagement with said grooves in opposite sides of said projection, each of said wires being releasably secured at opposite ends thereof to said one end of said confronting ends of said sections, and having a major portion thereof intermediate its ends overlying the ball bearings seated in one of said grooves in said projection.

3. In a shave tool holder as defined in claim 1, wherein each of said bearing caps has therein a pair of spaced, circular openings each of which registers with one of said arcuate recesses in the associated cap to enable the transfer of ball bearings to and from said raceways through said openings, and a cover is removably secured over each of said openings.

4. In a shave tool holder as defined in claim 1, wherein each of said opposite ends of said projection has formed therein a pair of spaced, segmental spherical recesses each of which is disposed between one end of one of said bores and the adjacent end of one of said grooves, and which confronts upon one of said arcuate recesses in the associated bearing cap, and one of four additional ball bearings is secured in each of said segmental spherical recesses and projects into the registering arcuate recess of said associated bearing cap to be engaged by the respective set of the ball bearings that travel therethrough.

5. In a shave tool holder as defined in claim 1, including manually operable means for adjusting the space between said opposite sides of said recess in said other confronting end of said sections.

6. In a shave tool holder as defined in claim 5, wherein said recess in said other confronting ends of said sections has a slot in the bottom thereof, and said manually operable adjusting means includes a plurality of screws extending transversely of said slot and adjustable selectively to increase or decrease the space between opposite sides of said slot, thereby to adjust the width of said recess.

\* \* \* \* \*